United States Patent
Yiu et al.

(10) Patent No.: US 10,306,584 B2
(45) Date of Patent: May 28, 2019

(54) USER EQUIPMENT, COMPUTER READABLE MEDIUM, AND METHOD TO DETERMINE THE MOBILITY OF USER EQUIPMENT IN A LONG-TERM EVOLUTION NETWORK

(71) Applicant: Intel IP Corporation, Santa Clara, CA (US)

(72) Inventors: Candy Yiu, Portland, OR (US); Ana Lucia Pinheiro, Portland, OR (US); Marta Martinez Tarradell, Hillsboro, OR (US)

(73) Assignee: Intel IP Corporation, Santa Clara, CA (US)

(*) Notice: Subject to any disclaimer, the term of this patent is extended or adjusted under 35 U.S.C. 154(b) by 10 days.

(21) Appl. No.: 15/111,880

(22) PCT Filed: Feb. 20, 2015

(86) PCT No.: PCT/US2015/016844
§ 371 (c)(1),
(2) Date: Jul. 15, 2016

(87) PCT Pub. No.: WO2015/127223
PCT Pub. Date: Aug. 27, 2015

(65) Prior Publication Data
US 2016/0338002 A1 Nov. 17, 2016

Related U.S. Application Data

(60) Provisional application No. 61/943,978, filed on Feb. 24, 2014.

(51) Int. Cl.
*H04W 64/00* (2009.01)
*H04W 24/08* (2009.01)
(Continued)

(52) U.S. Cl.
CPC ......... *H04W 64/006* (2013.01); *H04L 5/0048* (2013.01); *H04L 5/0057* (2013.01);
(Continued)

(58) Field of Classification Search
CPC ............... H04W 64/006; H04W 36/32; H04W 36/0094; H04W 24/04; H04W 24/08;
(Continued)

(56) References Cited

U.S. PATENT DOCUMENTS 5,602,903 A * 2/1997 LeBlanc ................. G01S 1/045
342/450
2010/0240356 A1 9/2010 Lee et al.
(Continued)

FOREIGN PATENT DOCUMENTS

| CN | 106416351 A | 2/2017 |
|----|-------------|--------|
| EP | 2326130 A1 | 5/2011 |

(Continued)

OTHER PUBLICATIONS

"European Application Serial No. 15752757.3, Extended European Search Report dated Aug. 9, 2017", 11 pgs.
(Continued)

*Primary Examiner* — George Eng
*Assistant Examiner* — Hung K Du
(74) *Attorney, Agent, or Firm* — Schwegman Lundberg & Woessner, P.A.

(57) ABSTRACT

User Equipment (UE), computer readable medium, and method to determine a mobility of the UE are disclosed. The UE may include circuitry configured to determine a plurality of signals from a serving cell. The each signal of the plurality of signals may be one or more of: a reference signal receive power (RSRP), a reference signal receive quality (RSRQ), a received signal strength indicator (RSSI), a signal-to-noise ratio (SNR), a signal-to-interference-ratio
(Continued)

(SIR), a signal-to-interference-plus-noise ratio (SINR), and a CQI. The circuitry may be configured to determine a measure for each of a window size of the plurality of signals. Each measure may be a variance of the plurality of signals, a standard deviation of the plurality of signals, a percent confidence interval (CI) of a mean of the measure, and a linear combination of measures. The circuitry may determine whether the UE is stationary based on one or more measures.

21 Claims, 18 Drawing Sheets

(51) Int. Cl.
  *H04W 24/10* (2009.01)
  *H04W 8/08* (2009.01)
  *H04W 8/22* (2009.01)
  *H04W 88/02* (2009.01)
  *H04L 5/00* (2006.01)

(52) U.S. Cl.
  CPC ............... *H04W 8/08* (2013.01); *H04W 8/22* (2013.01); *H04W 24/08* (2013.01); *H04W 24/10* (2013.01); *H04W 88/02* (2013.01)

(58) Field of Classification Search
  CPC ......... H04W 24/10; H04W 8/08; H04W 8/22; H04W 88/02; H04L 5/001; H04L 5/0048; H04L 5/0057
  See application file for complete search history.

(56) References Cited

U.S. PATENT DOCUMENTS

| | | |
|---|---|---|
| 2010/0272018 A1 | 10/2010 | Furueda et al. |
| 2011/0034127 A1 | 2/2011 | Wentink et al. |
| 2011/0086652 A1 | 4/2011 | So et al. |
| 2011/0117856 A1 | 5/2011 | Veluppillai et al. |
| 2011/0151919 A1 | 6/2011 | Shin |
| 2012/0196644 A1* | 8/2012 | Scherzer ............... H04W 48/18 455/524 |
| 2012/0214541 A1* | 8/2012 | Narasimha ............... H04L 5/001 455/525 |
| 2012/0275336 A1 | 11/2012 | Wise et al. |
| 2013/0100837 A1 | 4/2013 | Iwamura |
| 2013/0150012 A1* | 6/2013 | Chhabra ............... H04W 48/16 455/418 |
| 2013/0258876 A1* | 10/2013 | Damji ............... H04W 52/0254 370/252 |
| 2013/0286959 A1 | 10/2013 | Lou et al. |
| 2013/0331106 A1* | 12/2013 | Makh .................. H04W 36/32 455/440 |
| 2014/0133465 A1* | 5/2014 | Johansson ............. H04W 24/04 370/332 |
| 2014/0160966 A1 | 6/2014 | Kang et al. |
| 2014/0194113 A1* | 7/2014 | Ahlstrom .............. H04W 24/08 455/423 |
| 2015/0009917 A1 | 1/2015 | Cho et al. |

FOREIGN PATENT DOCUMENTS

| | | |
|---|---|---|
| JP | 2009534980 A | 9/2009 |
| JP | 2010258845 A | 11/2010 |
| JP | 2010283632 A | 12/2010 |
| KR | 1020160095090 A | 8/2016 |
| KR | 101821513 B1 | 1/2018 |
| WO | WO-2015127223 A1 | 8/2015 |
| WO | WO-2016126395 A1 | 8/2016 |

OTHER PUBLICATIONS

"Korean Application Serial No. 10-2016-7018031, Office Action dated Sep. 6, 2017", w/English Translation, 10 pgs.
"Korean Application Serial No. 10-2016-7018031, Response filed Oct. 11, 2017 to Office Action dated Sep. 6, 2017", (W/ English Claims), 14 pgs.
"Mobility State Estimation Enhancements using RSRP", Intel Corporation, 3GPP Draft; R2-132810 Mobility State Estimation Using RSRP, 3rd Generation Partnership Project (3GPP), Mobile Competence Centre ; 650, Route Des Lucioles ; F-06921 Sophia-Antipolis Cedex ; France, [Online] retrieved from the internet: <http://www.3gpp.org/ftp/tsg_ran/WG2_RL2/TSGR2_83/Docs/>, (Aug. 10, 2013), 9 pgs.
"Report of email discussion [84#31] [LTE/Het-Net] Mobility information upon IDLE->Connected", Alcatel-Lucent (Rapporteur), 3GPP Draft; R2-140703 84 31-Final-V3, 3rd Generation Partnership Project (3GPP),Mobile Competence Centre ; 650, Route Des Lucioles ; F-06921 Sophia-Antipolis Cedex ; France, [Online] retrieved from the internet: <http://www.3gpp.org/ftp/Meetings3GPPSYNC/RAN2/Docs/>, (Feb. 13, 2014), 33 pgs.
"Stage 3 Signaling for mobility state estimation using RSRP", Intel Corporation:, 3GPP Draft; R2-133505 Stage 3 Signalingfor Mobility State Estimation Using RSRP,3rd Generation Partnership Project (3GPP),Mobile Competence Centre ; 650, Route Deslucioles ; F-06921 Sophia-Antipol, [Online] retrieved from the internet: <http://www.3gpp.org/ftp/tsg ran/WG2RL2/TSGR2_83bis/Docs/>, (Sep. 28, 2013), 3 pgs.
"International Application Serial No. PCT/US2015/016844, International Preliminary Report on Patentability dated Sep. 9, 2016", 10 pgs.
"Korean Application Serial No. 10-2016-7018031, Office Action dated Mar. 29, 2017", (W/ partial English translation), 8 pgs.
"Korean Application Serial No. 10-2016-7018031, Response Filed May 29, 2017 to Office Action dated Mar. 29, 2017", (W/ English Claims), 11 pgs.
Alcatel-Lucent, et al., "UE mobility information on Idle to Connected transition", 3GPP TSG-RAN WG2#83bis, R2-133448, [Online] retrieved from the internet: <http://www.3GPP.org/ftp/tsa_ran/WG2_RL2/TSGR2_83bis/Docs/>, (Sep. 28, 2013), 2 pgs.
"International Application Serial No. PCT/US2016/013185, International Search Report dated Apr. 25, 2016", 3 pgs.
"International Application Serial No. PCT/US2016/013185, Written Opinion dated Apr. 25, 2016", 8 pgs.
Ericsson, A B, et al., "UL & DL DSC and TPC MAC simulations", IEEE, (Jul. 15, 2014), 1-16.
"International Application Serial No. PCT/US2015/016844, International Search Report dated Jun. 5, 2015", 3 pgs.
"International Application Serial No. PCT/US2015/016844, Written Opinion dated Jun. 5, 2015", 8 pgs.
"European Application Serial No. 15752757.3, Response filed Mar. 5, 2018 to Extended European Search Report dated Aug. 9, 2017", 9 pgs.
"Japanese Application Serial No. 2016-553441, Office Action dated Oct. 24, 2017", With English Translation, 8 pgs.
"Japanese Application Serial No. 2016-553441, Response Filed Jan. 19, 2018 to Office Action dated Oct. 24, 2017", (W/ English Claims), 16 pgs.
"Mobility State Estimation Enhancements using RSR", R2-132810 Mobility State Estimation Using Rsrp, 3rd Generation Partnership Project (3GPP), Mobile Competence Centre ; 650, Route Des Lucioles, (Aug. 10, 2013), 20130819-20130823.

* cited by examiner

```
RRCConnectionSetupComplete-v12xy-IEs ::= SEQUENCE {
    mobilityState-r12            ENUMERATED {normal, medium, high, stationary}  OPTIONAL,
    mobilityHistoryAvail-r12     ENUMERATED (true)                              OPTIONAL
    nonCriticalExtension         SEQUENCE ()
}
```

FIG. 8

USER EQUIPMENT, COMPUTER READABLE MEDIUM, AND METHOD TO DETERMINE THE MOBILITY OF USER EQUIPMENT IN A LONG-TERM EVOLUTION NETWORK

PRIORITY CLAIM

This application is a U.S. National Stage Filing under 35 U.S.C. 371 from International Application No. PCT/US2015/016844, filed Feb. 20, 2015 and published in English as WO 2015/127223 on Aug. 27, 2015, which claims the benefit of priority to U.S. Provisional Patent Application Ser. No. 61/943,978, filed Feb. 24, 2014, each of which is incorporated herein by reference in its entirety.

TECHNICAL FIELD

Embodiments pertain to wireless communications. Some embodiments relate to determining a motion of user equipment in cellular networks, such as Long-Term Evolution (LTE) networks. Some embodiments relate to sending and receiving a mobility of user equipment. Some embodiments relate to taking actions based on the mobility of the user equipment.

BACKGROUND

A user equipment (UE) may be mobile. For example, a UE may be a mobile telephone. It may be useful for a network to know the mobility of the UE to perform a service for the UE. Moreover, the UE may perform a method differently if the UE is aware the UE is moving.

However, determining a mobility of the UE using Global Position Satellites may be resource intensive. Thus, there are general needs for determining a mobility of a UE without GPS.

BRIEF DESCRIPTION OF THE DRAWINGS

FIG. 8 illustrates an information element in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
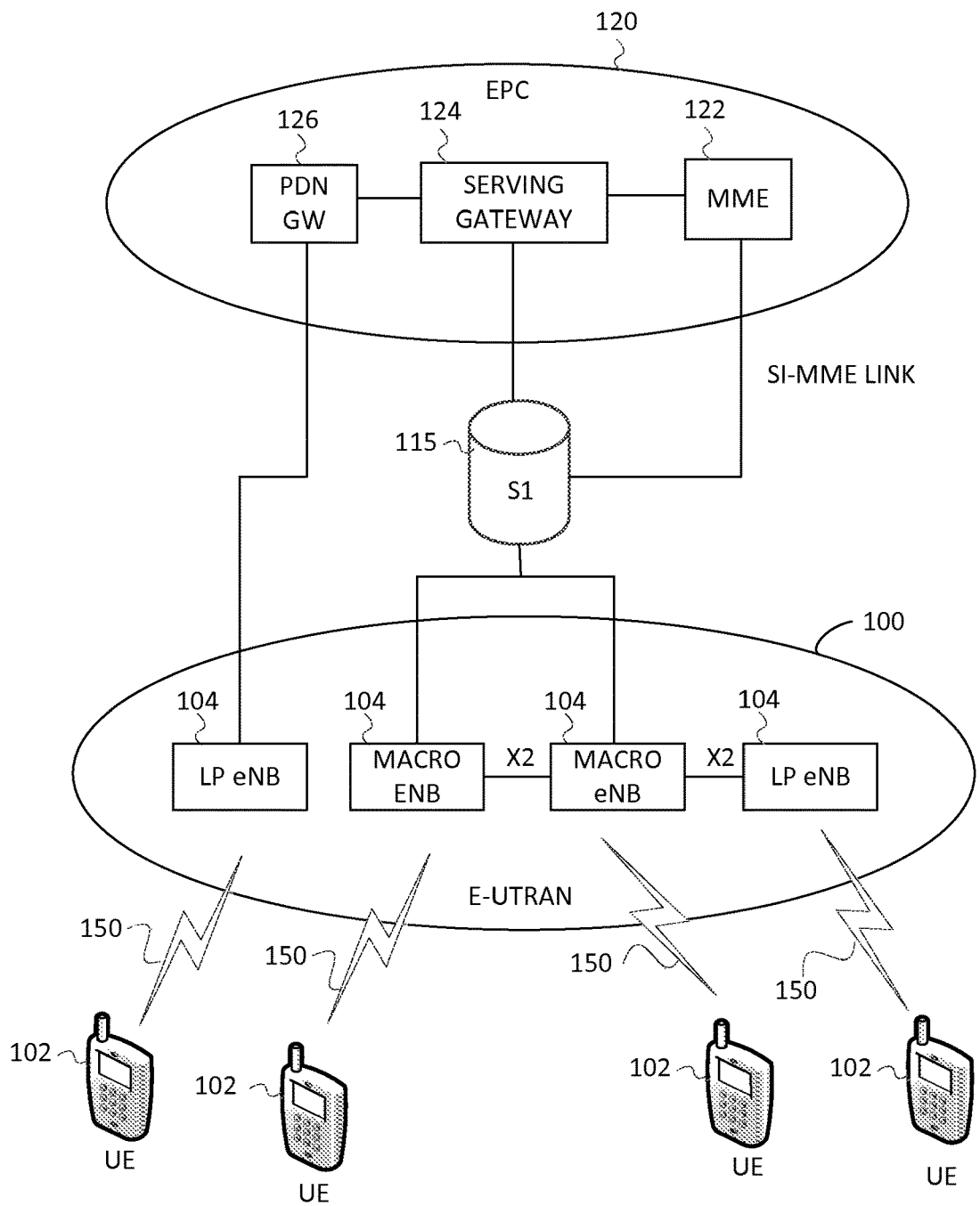
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network comprises a radio access network (RAN) 100 (e.g., as depicted, the E-UTRAN or evolved universal terrestrial radio access network) and the core network 120 (e.g., shown as an evolved packet core (EPC)) coupled together through an S1 interface 115. For convenience and brevity's sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node Bs (eNBs) 104 (which may operate as base stations) for communicating with the UE 102. The eNBs 104 may include macro eNBs and low power (LP) eNBs. The UE 102 and eNBs 104 are transmitting and receiving communications 150.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the core network 120 (an EPC network here) and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including, but not limited to, RNC (radio network controller functions) such as radio bearer management, uplink and downlink dynamic radio resource management or control (RRC) and data packet scheduling, and mobility management. In some cases the RRC functions are handled by another part of the RAN 100. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the core network 120, which may be an EPC network. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells may be used to extend coverage to indoor areas where outdoor signals do not reach well, or to add network capacity or increase data rates. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, an LP eNB might be a femtocell eNB since it is coupled through the PDN GW 126. Similarly, a picocell is a wireless communication system typically covering a small area, such as in-building (offices, shopping malls, train stations, etc.), or more recently, in-aircraft. A picocell eNB can generally connect through the X2 link to another eNB, such as a macro eNB, through its base station controller (BSC) functionality. Thus, an LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In accordance with some embodiments, the UE 102 and eNB 104 may be configured for one or more of the example embodiments described herein for determining the mobility of the UE 102 by methods such as the methods disclosed in conjunction with FIGS. 2-10. The UE 102 and/or eNB 104 may also be configured to report and receive the mobility of the UE 102 as well as to perform actions based on the mobility, such as enhanced signaling, if the UE 102 is mobile prior to a handover.

Figure 2:
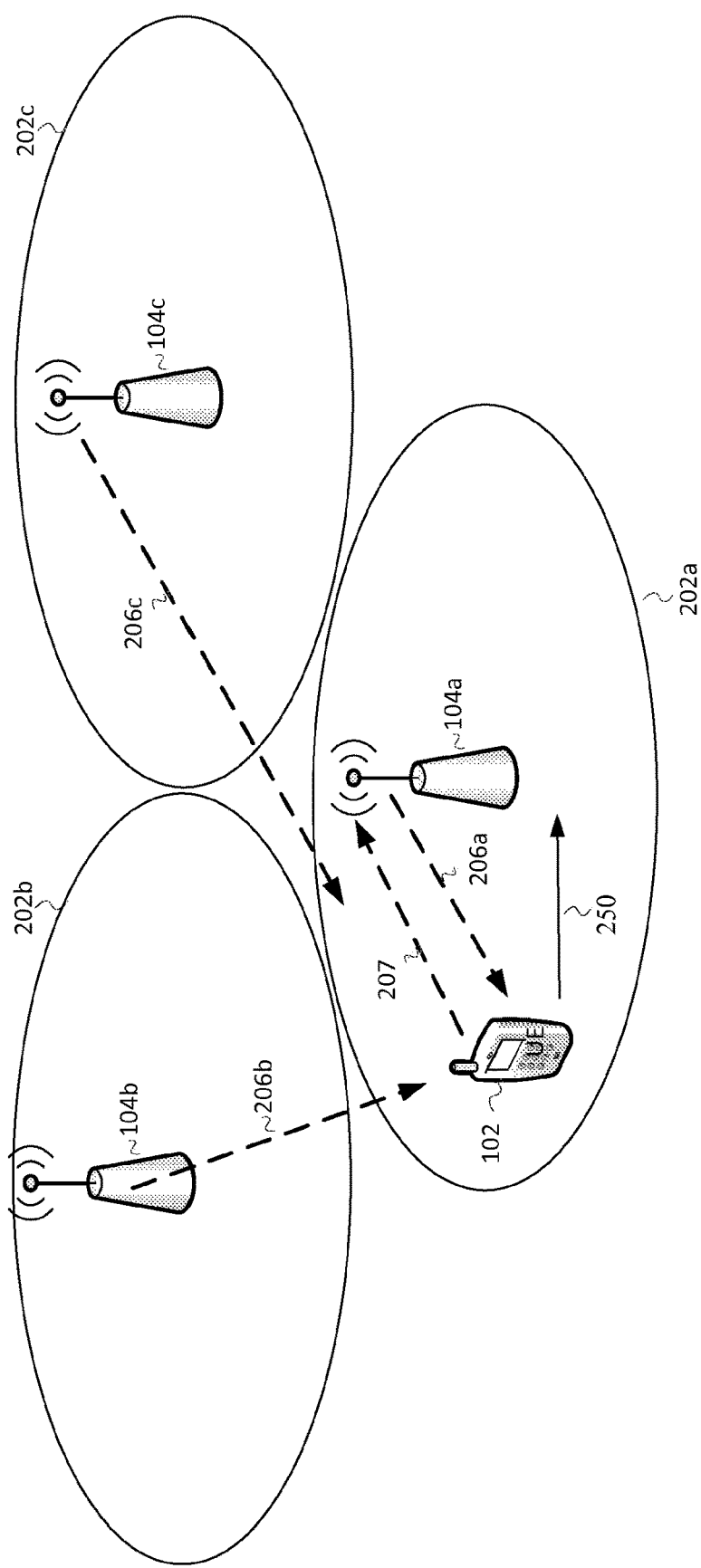
FIG. 2 illustrates the speed of a UE in accordance with some embodiments.

FIG. 2 illustrates the speed 250 of a UE 102 in accordance with some embodiments. Illustrated in FIG. 2 are eNBs 104a, 104b, 104c; cells 202a, 202b, 202c; a UE 102; the speed 250 of the UE 102; signals 206a, 206b, 206c; and signals 207. The cells 202 may be cells of a Long-Term Evolution wireless network. Cell 202a may be a serving cell for the UE 102. Cells 202b, 202c may be neighboring cells. Signals 206a, 206b, 206c may be signals transmitted from the eNBs 104a, 104b, 104c, respectively. The signals 206a, 206b, 206c, 207 may include signals transmitted by the eNBs 104a, 104b, 104c and/or the UE 102. The eNBs 104a, 104b, 104c may transmit signals 206a, 206b, 206c that are measured at the UE 102 such as reference signal receive power (RSRP), reference signal receive quality (RSRQ), received signal strength indicator (RSSI), signal-to-noise ratio (SNR), signal-to-interference-ratio (SIR), signal-to-interference-plus-noise ratio (SINR), and channel quality indication (CQI).

An example signal 206a, 206b, 206c is RSRP, which may be the average power of Resource Elements (RE) that carry serving cell 202a-specific Reference Signals (RS) over the entire bandwidth, so that RSRP may be only measured in the symbols carrying RS. The UE 102 may be attached to eNB 104a. The UE 102 may receive signals 206b, 206c from one or more neighboring eNBs 104b, 104c, respectively. The UE 102 may send signals 207 to the eNB 104a.

The speed 250 of the UE 102 may indicate the motion of the UE 102. For example, the speed 250 may be a velocity that includes an x, y, and z component. The speed 250 may be used to determine whether the UE 102 is stationary. The UE 102 and/or eNB 104a may be configured to determine whether the UE 102 is stationary. In example embodiments, the eNBs 104a, 104b, 104c may be other access points to a wireless network. For example, the eNBs 104a, 104b, 104c may be Institute of Electrical and Electronic Engineers (IEEE) 802.11 access points or stations, IEEE 802.15, a base station configured for global system for mobile communications (GSM), enhanced data rates for GSM evolution (EDGE), or GSM/EDGE RAN (GERAN).

Figure 3A:
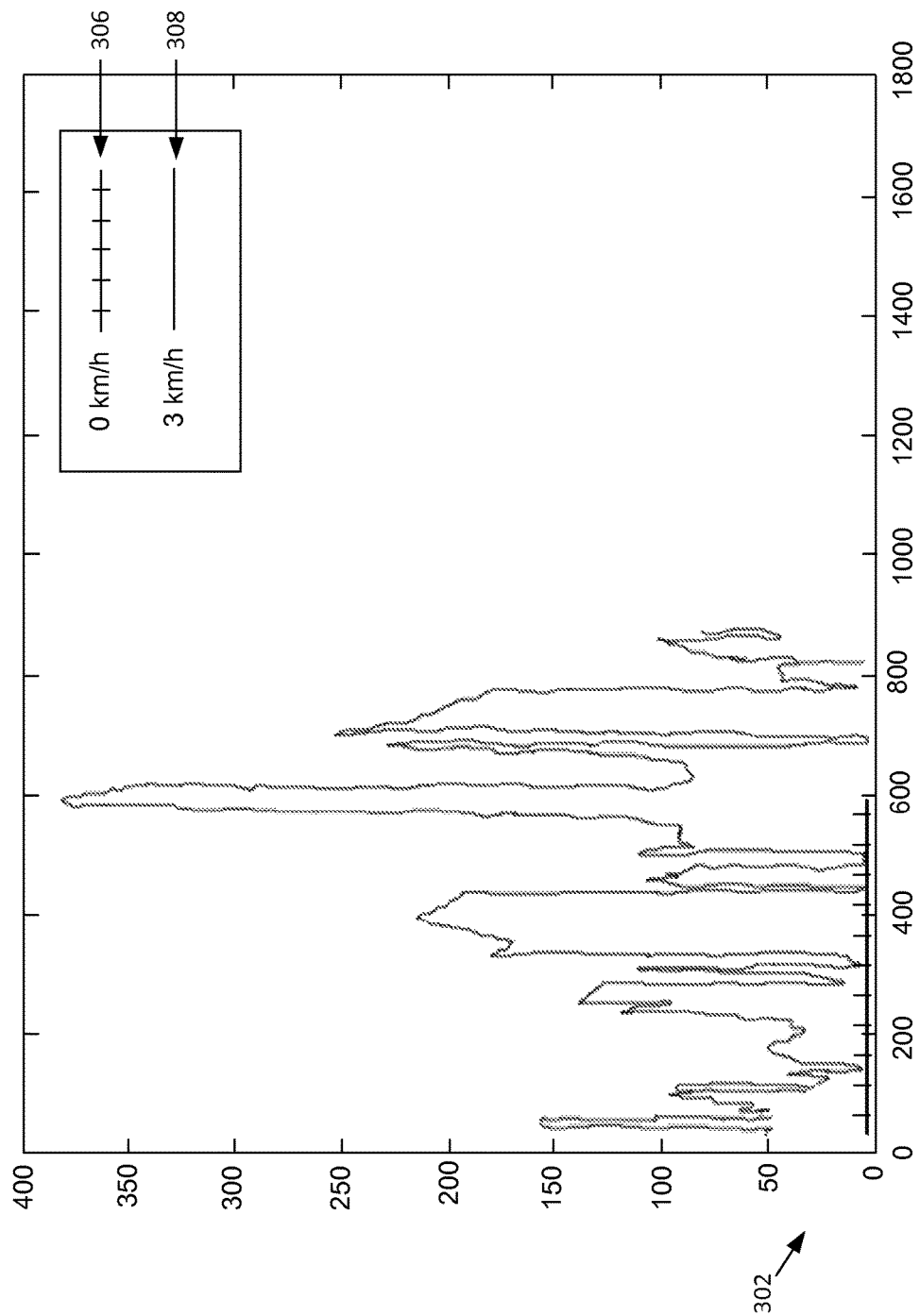
FIGS. 3A, 3B, and 3C illustrate a variance of reference signal receive power (RSRP) for different speeds of the UE in accordance with some embodiments.
Figure 3B:
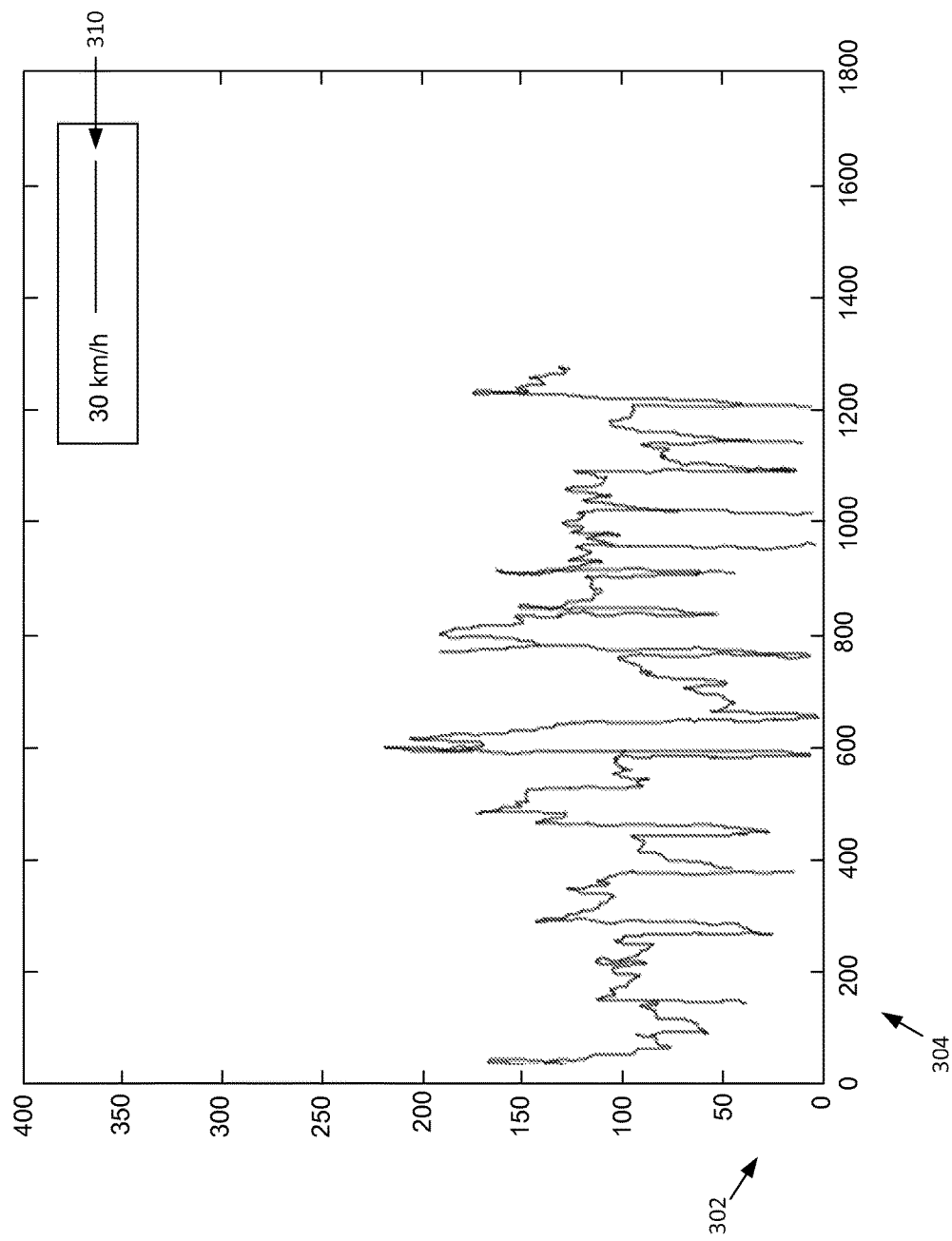
Figure 3C:
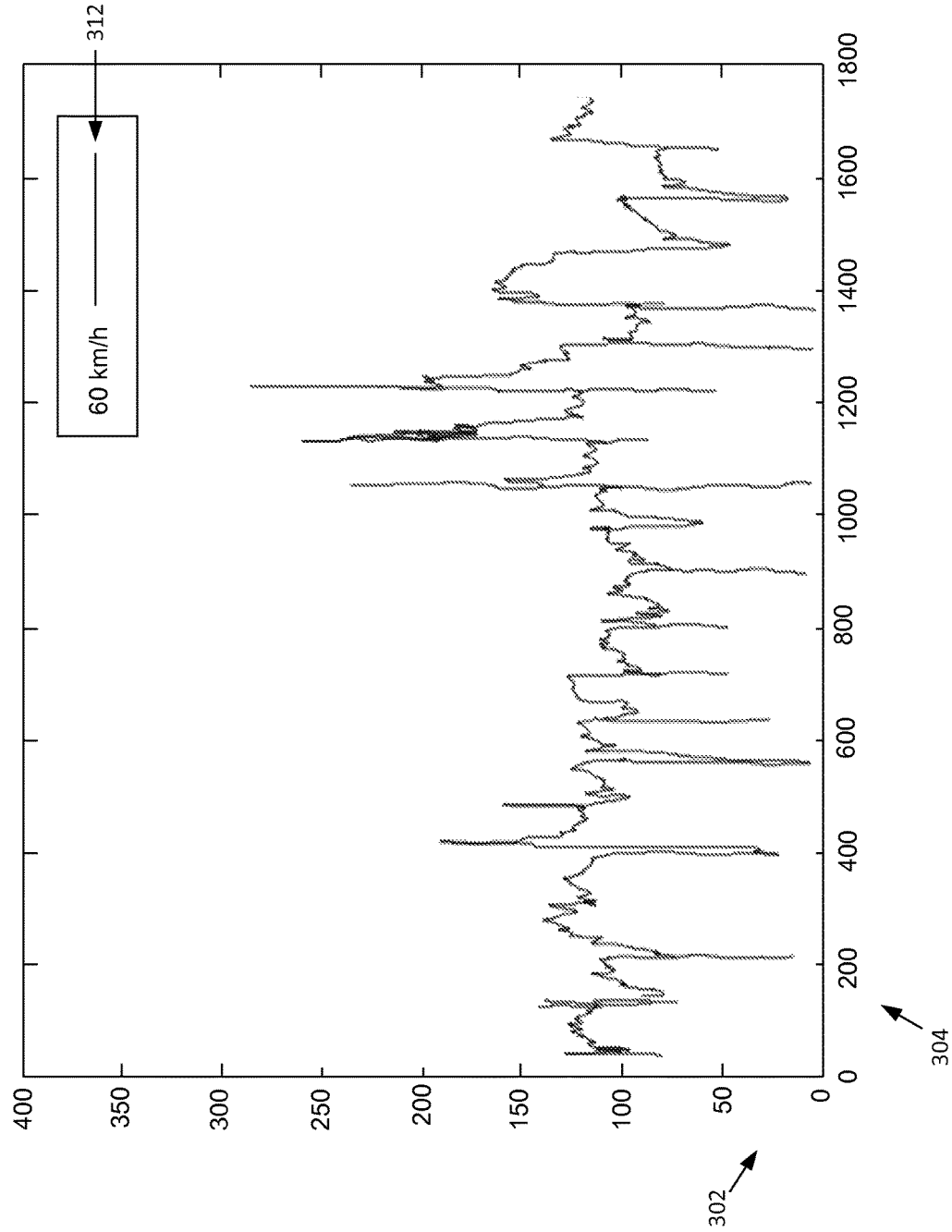

FIGS. 3A, 3B, and 3C illustrate a variance of reference signal receive power (RSRP) for different speeds 250 of the UE 102 in accordance with some embodiments. Illustrated along the vertical axis is a variance 302, and illustrated along the horizontal axis is a variance determination 304. Each variance determination 304 may be based on a window of samples of RSRP. For example, there may be 100 samples of RSRP taken as a window size. The variance determination 304 at 200 may be the 200th time that a variance determination 304 is made with 100 samples of RSRP. Each sample of RSRP is taken in time after the previous sample of RSRP. FIGS. 3A, 3B, and 3C illustrate the variance determination 304 for a UE 102 with a speed 250 (FIG. 2) of 0 km/h 306 (FIG. 3A), 3 km/h 308 (FIG. 3A), 30 km/h 310 (FIG. 3B), and 60 km/h 312 (FIG. 3C). The variance 302 may be determined according to Equation (1).

$$\text{Variance} = \frac{\sum_{k=0}^{n} x^k - \bar{x}}{n-1}. \qquad \text{Equation (1)}$$

In Equation (1), n is the number of samples; x is the RSRP; and, x̄ is the mean of RSRP measurements. The UE 102 and/or eNB 104 may determine the variance based on Equation (1). The UE 102 and/or eNB 104 may use a fixed window of size n, or a variable window based on a condition such as based on changes to RSRP above a threshold.

As illustrated in FIGS. 3A, 3B, and 3C, when the UE 102 is stationary (0 km/h 306 of FIG. 3A), the variance 302 is small, whereas the variance increases for 3 km/h 308, 30 km/h 310, and 60 km/h 312. The UE 102 and/or eNB 104 may be configured to distinguish between the different variances to determine if the UE 102 is stationary or mobile.

Figure 4A:
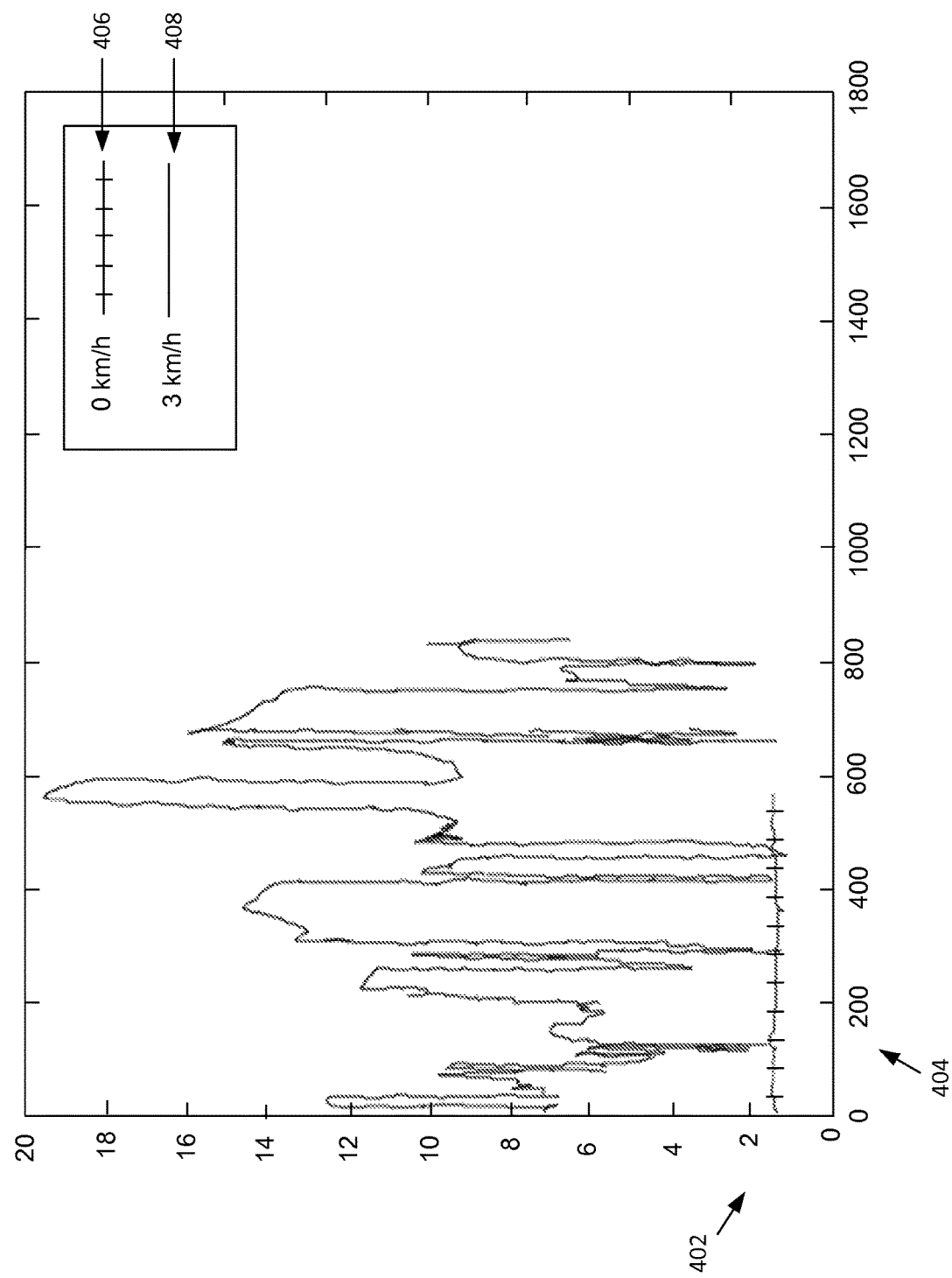
FIGS. 4A, 4B, and 4C illustrate a standard deviation of RSRP for different speeds of the UE in accordance with some embodiments.
Figure 4B:
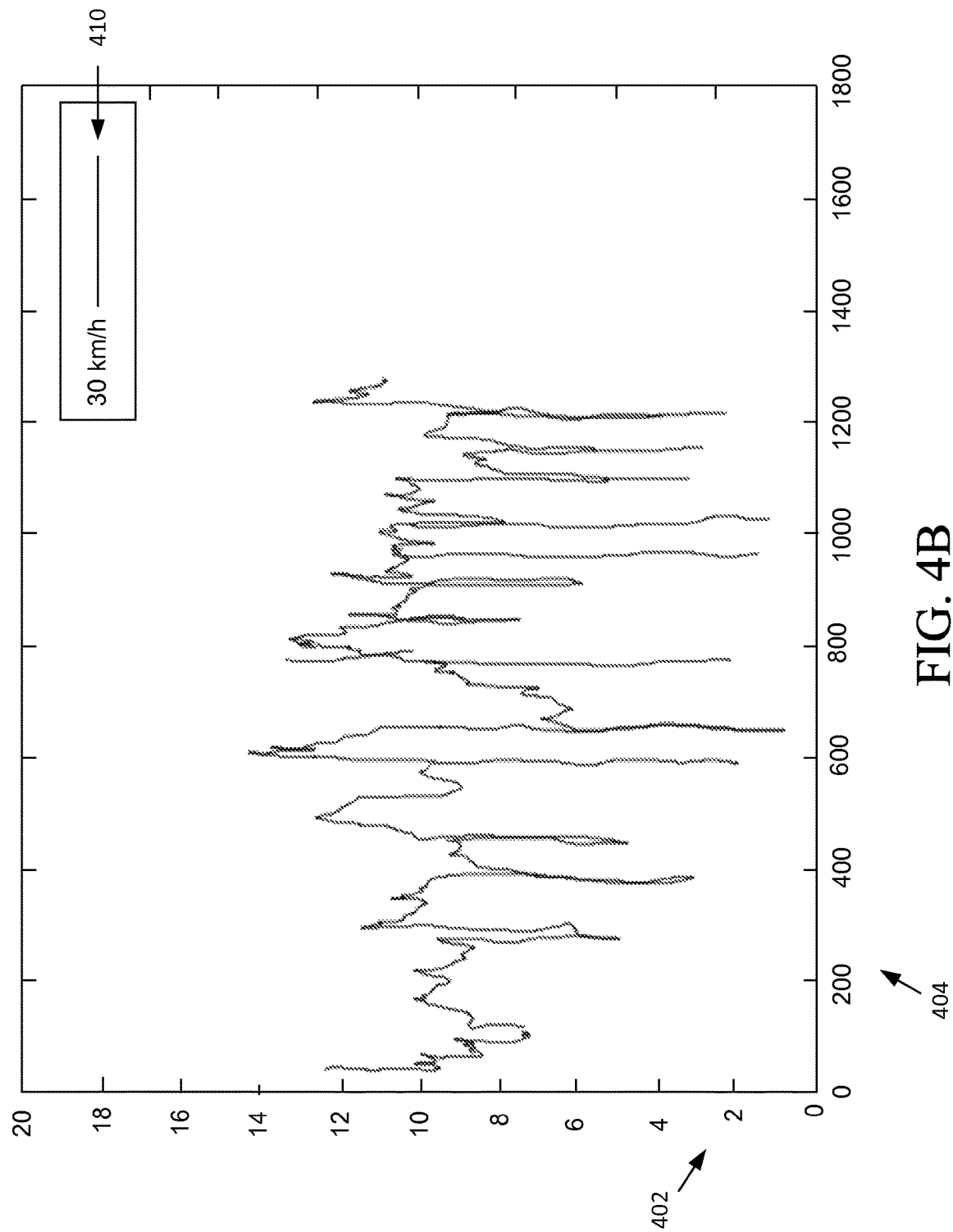
Figure 4C:
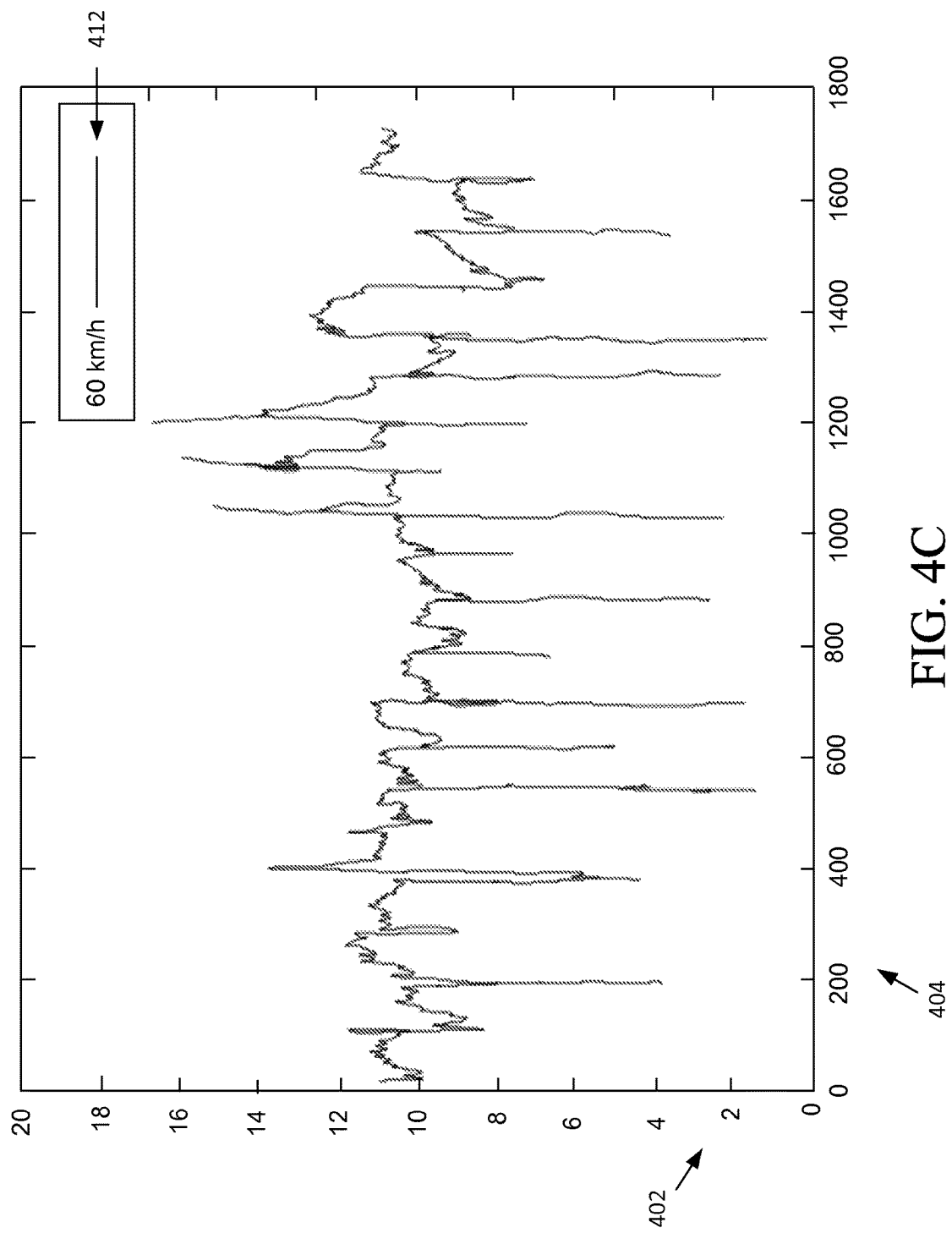

FIGS. 4A, 4B, and 4C illustrate a standard deviation of RSRP for different speeds 250 of the UE 102 in accordance with some embodiments. Illustrated along the vertical axis is the standard deviation 402 of RSRP, and illustrated along the horizontal axis is a standard deviation determination 404. Each standard deviation determination 404 may be based on a window of samples of RSRP. For example, there may be 100 samples of RSRP taken as a window size. The standard deviation determination 404 at 200 may be the 200th time that a standard deviation determination 404 is made with 100 samples of RSRP. FIGS. 4A, 4B, and 4C illustrate the standard deviation 402 for a UE 102 with a speed 250 (FIG. 2) of 0 km/h 406 (FIG. 4A), 3 km/h 408 (FIG. 4A), 30 km/h 410 (FIG. 4B), and 60 km/h 412 (FIG. 4C). The standard deviation 402 may be determined according to Equation 2.

$$\text{Standard Deviation} = \sqrt{\text{Variance}}. \qquad \text{Equation (2):}$$

In Equation (2), the variance may be determined using Equation (1). The UE 102 and/or eNB 104 may determine the standard deviation 402 based on Equation (2). The UE 102 and/or eNB 104 may use a fixed window of size n, or a variable window based on a condition such as based on changes to RSRP above a threshold.

As illustrated in FIGS. 4A, 4B, and 4C the standard deviation 402 when the UE 102 is stationary (0 km/h 406 of FIG. 4A) is small whereas the standard deviation 402 increases for 3 km/h 408, 30 km/h 410, and 60 km/h 412. The UE 102 and/or eNB 104 may be configured to distinguish between the different standard deviations 402 to determine if the UE 102 is stationary (0 km/h 406) or mobile.

Figure 5A:
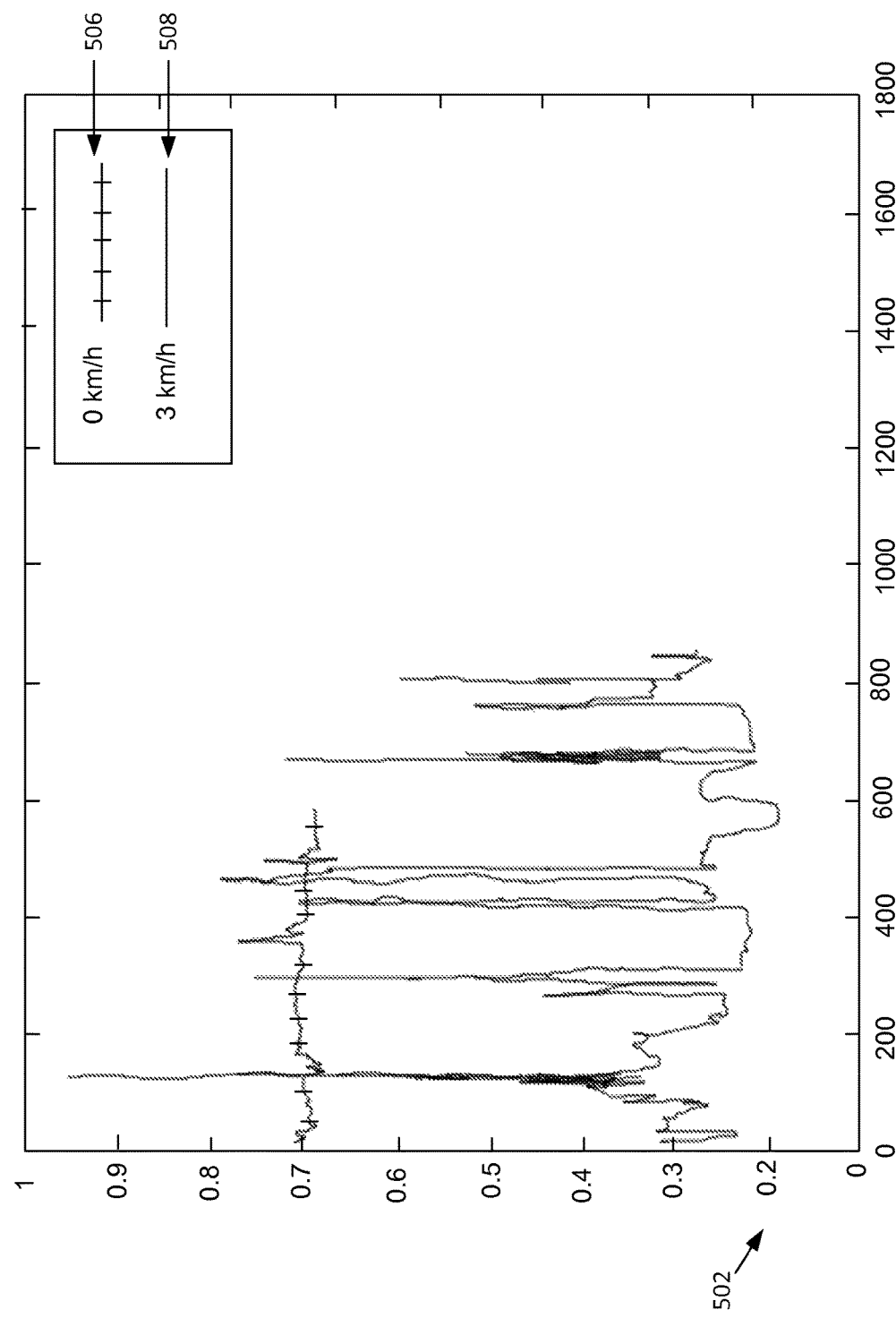
FIGS. 5A, 5B, and 5C illustrate a 90% confidence interval of RSRP for different speeds of the UE in accordance with some embodiments.
Figure 5B:
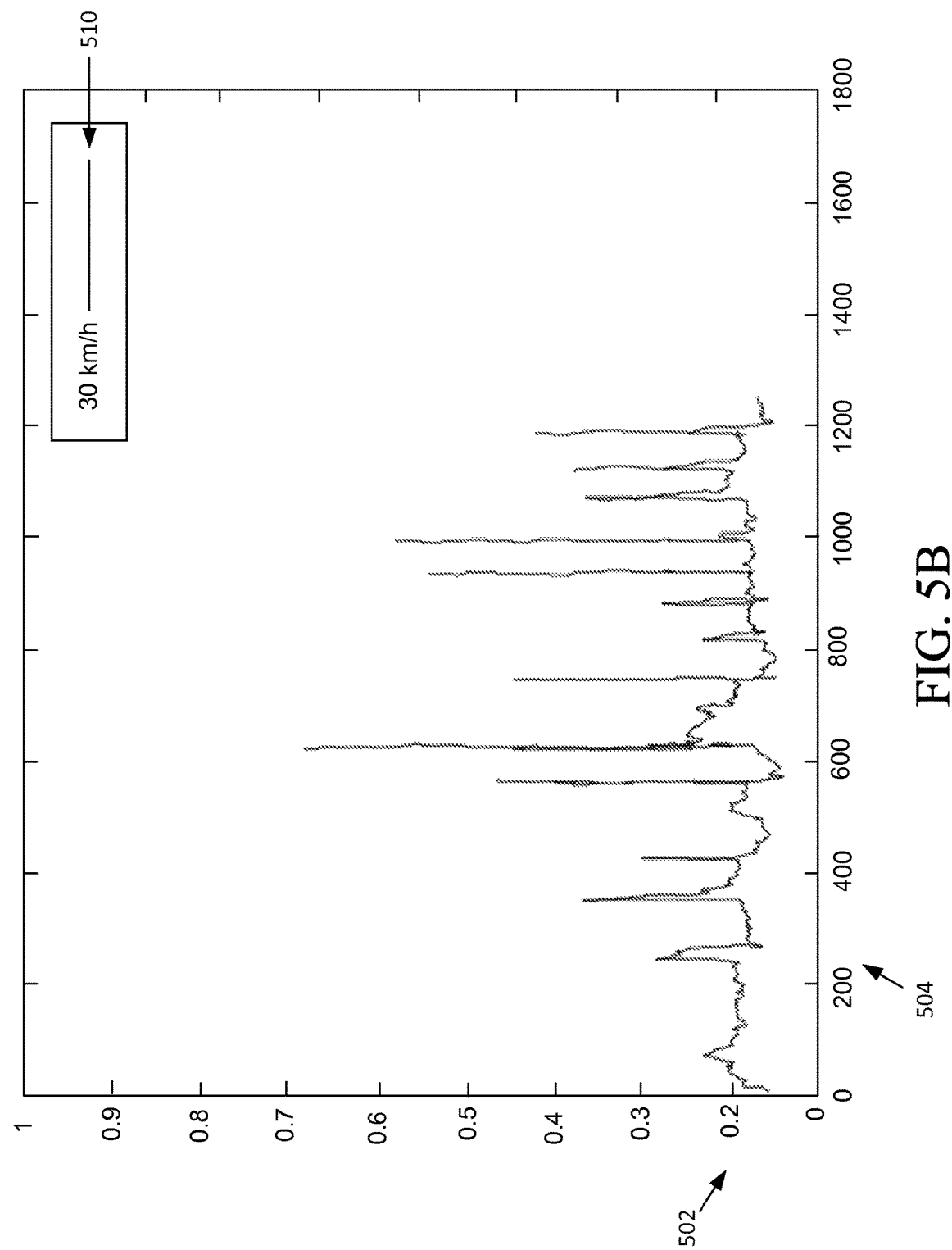
Figure 5C:
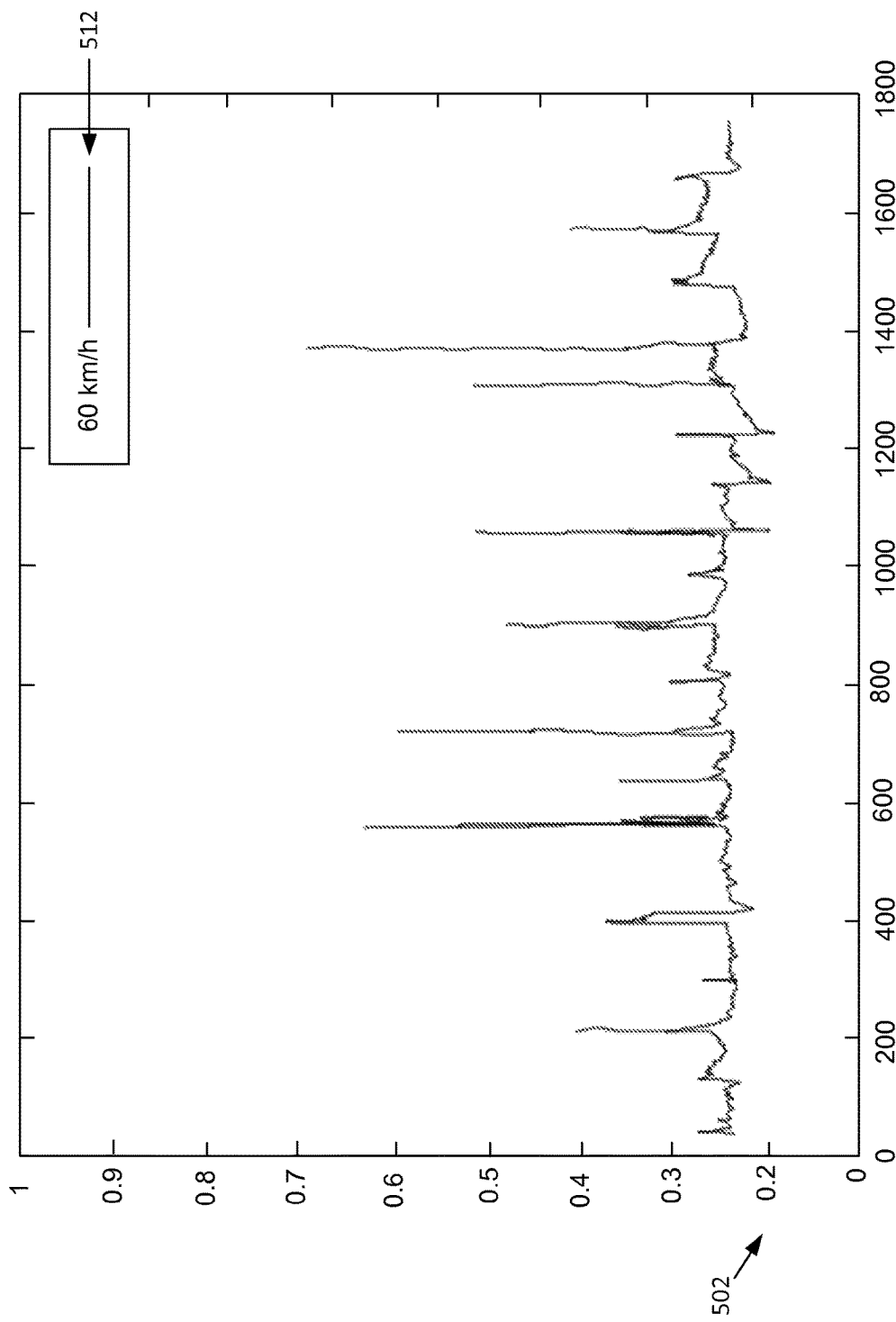

FIGS. 5A, 5B, and 5C illustrate a 90% confidence interval of RSRP for different speeds 250 of the UE 102 in accordance with some embodiments. Illustrated along the vertical axis is the confidence 502 of RSRP, and illustrated along the horizontal axis is a confidence interval determination 504. Each confidence interval determination 504 may be based on a window of samples of RSRP. For example, there may be 100 samples of RSRP taken as a window size. The confidence interval determination 504 at 200 may be the 200th time that a confidence interval determination 504 was made for a window of RSRP samples.

FIGS. 5A, 5B, and 5C illustrate the confidence interval of RSRP for a UE 102 with a speed 250 (FIG. 2) of 0 km/h 506 (FIG. 5A), 3 km/h 508 (FIG. 5A), 30 km/h 510 (FIG. 5B), and 60 km/h 512 (FIG. 5C). The confidence interval (CI) of RSRP may be determined according to Equation (3).

$$CI = t_{n-1} \frac{\text{Standard Deviation}}{\sqrt{n}}. \quad \text{Equation (3)}$$

In Equation (3), CI is confidence interval; n is the sample size; $t_{n-1}$ is the critical value for the confidence level for the p % from the t-distribution with n−1 degrees of freedom. The CI of RSRP may be determined using Equation (3). The UE 102 and/or eNB 104 may determine the CI of RSRP based on Equation (3). The UE 102 and/or eNB 104 may use a fixed window of n, or a variable window based on a condition such as based on changes to RSRP above a threshold.

As illustrated in FIGS. 5A, 5B, and 5C, when the UE 102 is stationary (0 km/h 506 of FIG. 5A), the CI is high whereas the CI decreases for 3 km/h 508, 30 km/h 510, and 60 km/h 512. The UE 102 and/or eNB 104 may be configured to distinguish between the different CIs (506, 508, 510, 512) to determine if the UE 102 is stationary (0 km/h 506) or mobile.

Figure 6A:
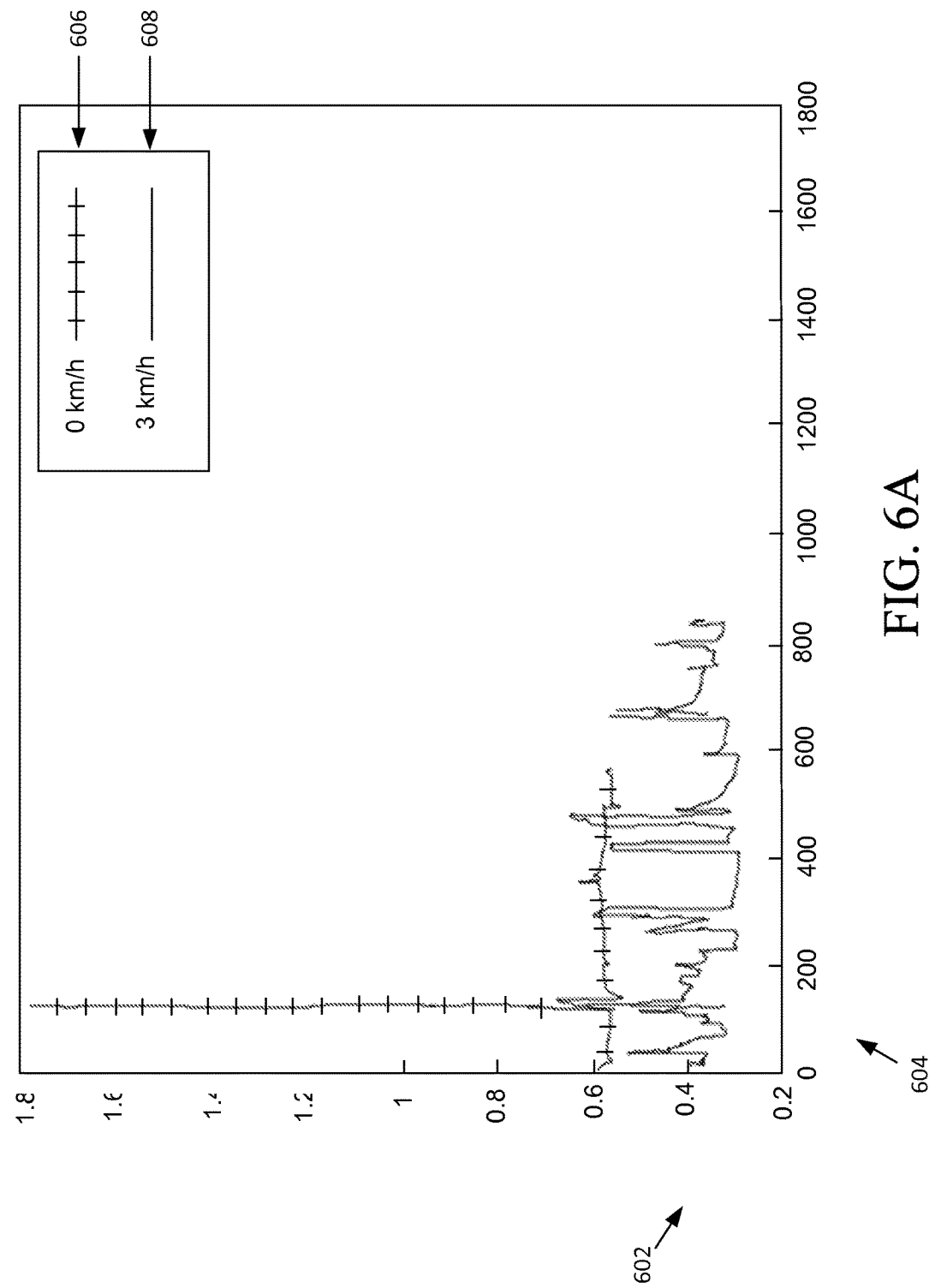
FIGS. 6A, 6B, and 6C illustrate a 90% confidence interval of RSRP offset for different speeds of the UE in accordance with some embodiments.
Figure 6B:
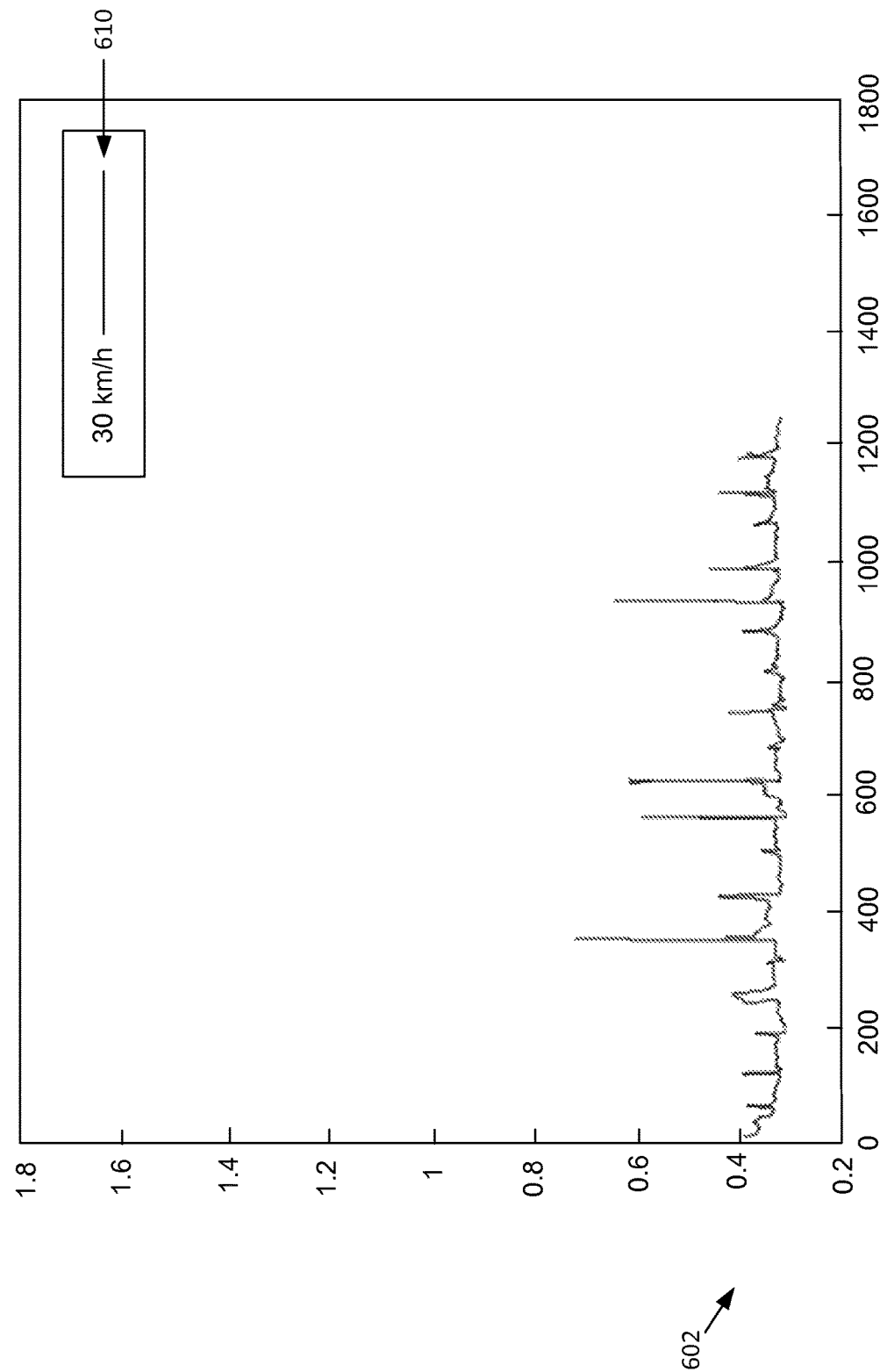
Figure 6C:
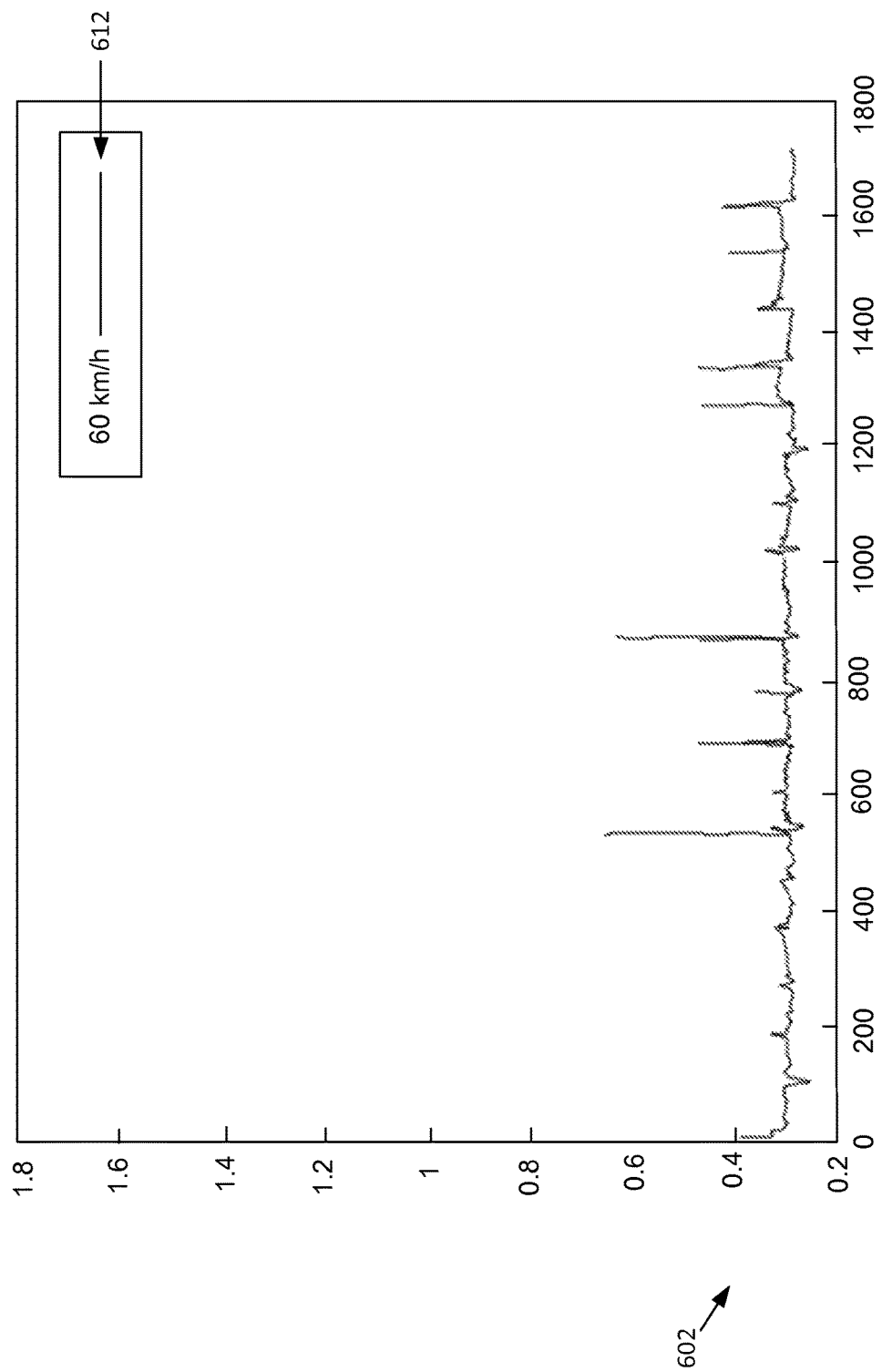

FIGS. 6A, 6B, and 6C illustrate a 90% confidence interval of RSRP offset for different speeds 250 of the UE 102 in accordance with some embodiments. Illustrated along the vertical axis is the confidence level offset 602 of RSRP, and illustrated along the horizontal axis is a confidence of RSRP offset determination 604. Each confidence of RSRP offset determination 604 may be based on a window of samples of RSRP. For example, there may be 100 samples of RSRP taken as a window size. The confidence interval determination 504 of RSRP at 200 may be the 200th time that a confidence interval determination 504 of RSRP was made for a window of RSRP samples.

FIGS. 6A, 6B, and 6C illustrate the confidence level offset 602 for a UE 102 with a speed 250 (FIG. 2) of 0 km/h 606 (FIG. 6A), 3 km/h 608 (FIG. 6A), 30 km/h 610 (FIG. 6B), and 60 km/h 612 (FIG. 6C). The RSRP offset may be determined based on a difference between the signals 206a received from the serving cell 202a (see FIG. 2) and signals 206b, 206c received from one or more neighboring cells 202b, 202c. The offset which may be a simple difference between the strongest neighbor cell 202b, 202b and the serving cell 202a.

For example, if the UE 102 is moving towards the serving cell 202a, then the signals 206a of the serving cell 202a, e.g., RSRP, increase while the signals 206b, 206c of the neighboring cells 202b, 202c may decrease. The UE 102 and/or eNB 104 may be configured to use this difference to determine the speed 250 of the UE 102. The confidence level offset 602 of RSRP may be determined according to Equation (4).

$$CI = t_{n-1} \frac{\text{Standard Deviation}}{\sqrt{n}}. \quad \text{Equation (4)}$$

In Equation (4), CI is confidence interval; n is the sample size; $t_{n-1}$ is the critical value for the confidence level for the p % from the t-distribution with n−1 degrees of freedom; standard deviation is the standard deviation of RSRP offset measurements.

The CI may be determined using Equation (4). The UE 102 and/or eNB 104 may determine the CI based on Equation (4). The UE 102 and/or eNB 104 may use a fixed window of n, or a variable window based on a condition such as based on changes to RSRP above a threshold.

Figure 7:
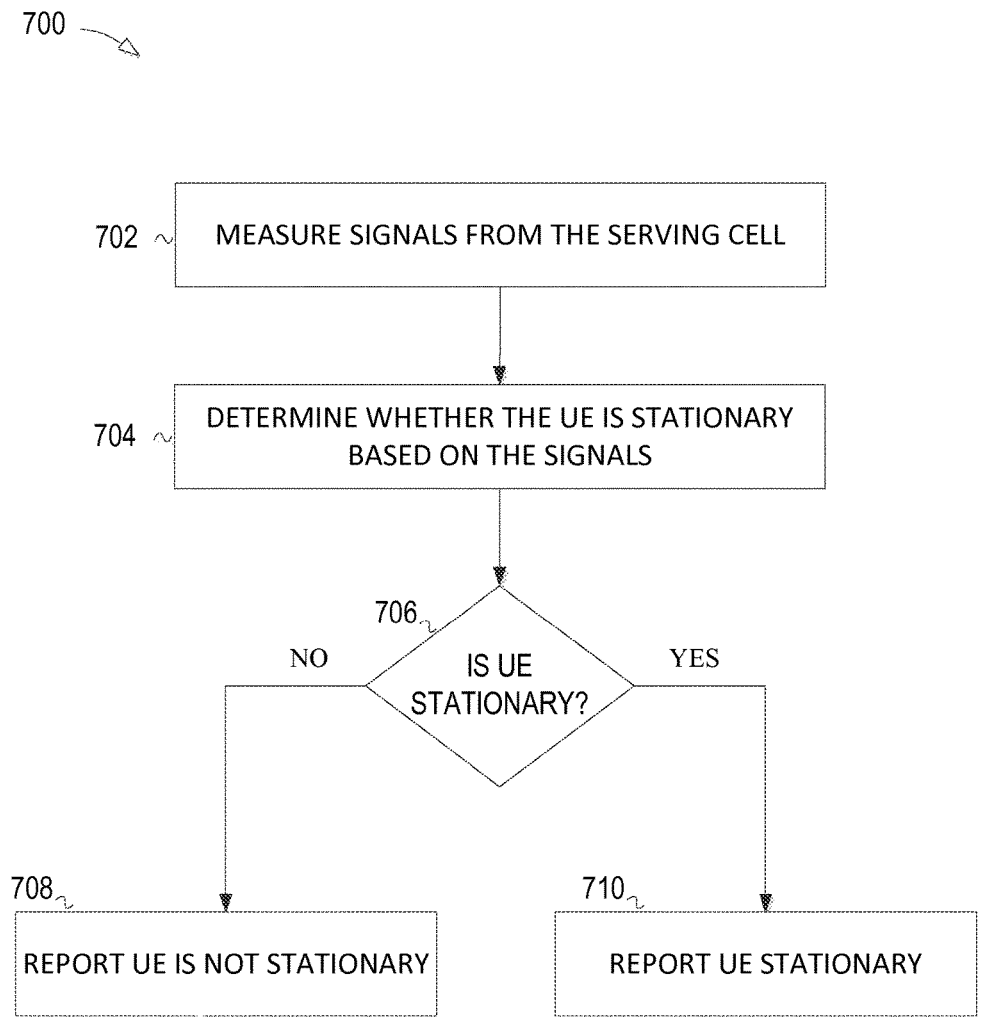
FIG. 7 illustrates a method of determining whether a UE is stationary, in accordance with some embodiments.

FIG. 7 illustrates a method 700 of determining whether a UE 102 is stationary in accordance with some embodiments. The method 700 may begin at operation 702 with measuring signals from the serving cell (e.g., cell 202a). For example, the signals may be one or more of a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), a channel quality indication (CQI), or other signal that may be measured by the UE 102 from the serving cell 202a. In example embodiments, the UE 102 may measure one or more signals from neighboring cells 202b, 202c.

The measurements may be part of a sliding window, fixed window, or variable sized window. The size of the window may depend on factors such as how the UE 102 determines whether or not it is stationary. Other factors may include whether the UE 102 is near an edge of the serving cell 202a. In example embodiments, the UE 102 may flush the measurements when the UE 102 changes serving cell 202a.

In some embodiments, a low pass filter may be used to filter minor errors that may be incurred in measuring the signals from the serving cell 202a and/or one or more of the neighboring cells 202b, 202c.

The method 700 may continue at operation 704 with determining whether the UE is stationary based on the signals. For example, as illustrated in FIGS. 3A, 3B, and 3C, the UE 102 may determine a variance of RSRP or another signal measured by the UE 102 from the serving cell 202a. The UE 102 may then determine whether or not the UE 102 is stationary based on the value of the variance. The UE 102 may determine that the UE 102 is stationary if the variance is below a threshold level. In example embodiments, the UE 102 may determine an approximate mobility of the UE 102 that may include a speed and/or direction and/or may include a category of mobility such as stationary, low or normal mobility, medium mobility, and high mobility. The UE 102 may use threshold values of the variance that may be predetermined to determine the mobility of the UE 102.

In other embodiments, as illustrated in FIGS. 4A, 4B, and 4C, the UE 102 may determine a standard deviation of RSRP or another signal measured by the UE 102 from the serving cell 202a. The UE 102 may then determine whether or not the UE 102 is stationary based on the value of the standard deviation. The UE 102 may determine that the UE 102 is stationary if the variance is below a threshold level.

In example embodiments, the UE 102 may determine an approximate mobility of the UE 102 that may include a speed and/or direction and/or may include a category of mobility such as stationary, low or normal mobility, medium mobility, and high mobility. The UE 102 may use threshold values of the standard deviation of RSRP that may be predetermined to determine the mobility of the UE 102.

In other embodiments, as illustrated in FIGS. 5A, 5B, and 5C, the UE 102 may determine a p % confidence interval (CI) for the mean of RSRP or another signal measured by the UE 102 from the serving cell 202a. Other signals measured by the UE 102 from the serving cell 202a may be used. The UE 102 may then determine whether or not the UE 102 is stationary based on the value of the CI. The UE 102 may determine that the UE 102 stationary if the CI is above a threshold level.

In example embodiments, the UE 102 may determine an approximate mobility of the UE 102 that may include a speed and/or direction and/or may include a category of mobility such as stationary, low or normal mobility, medium mobility, and high mobility. The UE 102 may use threshold values of the CI that may be predetermined to determine the mobility of the UE 102.

In still other embodiments, two or more of the embodiments disclosed above may be combined. For example, the UE 102 may use a linear combination as disclosed in Equation (5). Equation (5): Metric=$\alpha$*Variance+$\beta$*Standard Deviation+$\gamma$*CI, where $\alpha$, $\beta$, $\gamma$ may be between 0 and 1, and variance, standard deviation, and CI may be determined as described herein.

In other embodiments, the UE 102 may take measurements of a neighboring cell 202b, 202c and determine that the UE 102 is stationary if the measurements from a neighboring cell are stable within a threshold.

In some embodiments, the UE 102 may be configured to measure signals from neighboring cells 202b, 202c as well as the serving cell 202a. The UE 102 may determine an offset/difference between the strongest neighboring cell 202b, 202c and the serving cell 202a. For example, when the UE 102 is moving towards the serving cell 202a, RSRP increases while the neighboring cell signal 206b, 206c decreases. The UE 102 can then determine whether or not the UE 102 is stationary or mobile based on the determined offset/difference using one of the methods described herein such as a variance, threshold measure, standard deviation, or CI. The measurements from the serving cell 202a and the neighboring cells 202b, 202c may include a close measurement error. The offset/difference may provide a reduced error of the measured signals from the serving cell 202a and a more accurate determination of the UE's 102 mobility.

In some embodiments, the UE 102 is configured to measure the signals from two or more neighboring cells 202b, 202c. The UE 102 may select two or more neighboring cells 202b, 202c that have stronger signals from other neighboring cells 202b, 202c. One or more of the methods described herein such as variance, standard deviation, and/or CI may then be used on the measurements from each of the serving cell 202a and the two or more neighboring cells 202b, 202c. Using the signals from one neighboring cell may have the technical effect that the UE 102 may be able to determine whether the UE 102 is stationary when the UE 102 is moving in a circle around the serving cell 202a. Moreover, using the signals from two or more neighboring cells may have the technical effect that the UE 102 may be able to determine whether the UE 102 is stationary when the UE 102 is moving in a straight line with the same distance from the serving cell 202a and one neighboring cell 202b, 202c.

In still other embodiments, a weighted sum of the signals from the serving cell 202a and an offset/difference may be used. The UE 102 may select to measure the signals of the neighboring cells 202b, 202c with the strongest signals. The UE 102 may then determine Equation (6). Equation (6): Weighted Sum=$w_1$*$g(\alpha_i)$+$w_2$*$f(\alpha_i-\beta_i)$, where $\alpha_i$ is the measure of the serving cell 202a at time i, $\beta_i$ is the measure of a neighboring cell 202b, 202c at time I, and f and g may be one of the methods described herein such as variance, standard deviation, or CI. The UE 102 may then determine the UE's 102 mobility based on the Weighted Sum. For example, if the Weighted Sum is above a threshold, the UE 102 may determine that the UE 102 is not stationary. In example embodiments, the UE 102 may determine an approximate mobility of the UE 102 that may include a speed and/or direction and/or may include a category of mobility such as stationary, low or normal mobility, medium mobility, and high mobility. The UE 102 may use threshold values of the weighted average that may be predetermined to determine the mobility of the UE 102.

The method 700 may continue at operation 706 by the UE determining whether the UE is stationary. For example, the UE 102 may determine whether or not the UE 102 is stationary based on one of the methods described herein. If the UE 102 determines that it is not stationary, the method 700 may continue at operation 708. For example, if the UE 102 is not stationary, the UE 102 may chose different parameters or apply enhancements such as selecting handover parameters based on the UE 102 not being stationary. The UE 102 may send a message to the serving cell 202a indicating that the UE 102 is not stationary.

If the UE 102 determines that it is stationary, the method 700 may continue at operation 710. For example, if the UE 102 is stationary, the UE 102 may use different parameters or apply different enhancement such as handover parameters based on the UE 102 being stationary. In both operation 708 and operation 710, the UE 102 may report the mobility of the UE 102 to the network 100.

FIG. 8 illustrates an information element 800 in accordance with some embodiments. For example, in 3rd Generation Partnership Project (3GPP) RAN2, the UE 102 may send the information element 800 to the network 100 to indicate the mobility 802 of the UE 102. The UE 102 may be configured to report the mobility 802 of the UE 102 to the network when the UE 102 transitions from radio resource control (RRC) idle to RRC connected mode. The mobility 802 may be represented by two bits with four possible states of normal, medium, high, and stationary 804.

Figure 9:
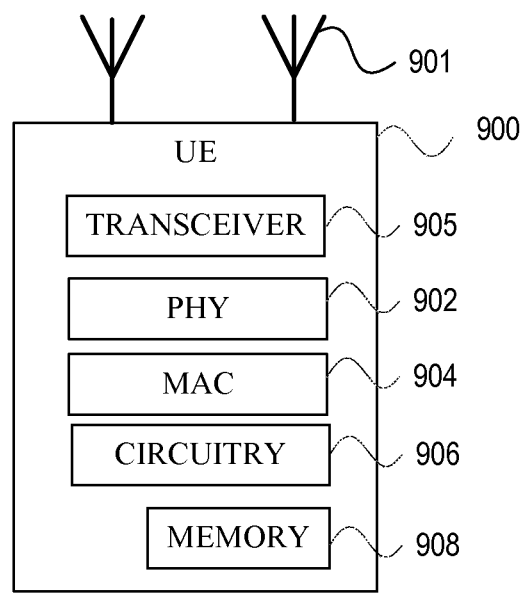
FIG. 9 illustrates a block diagram of a UE in accordance with some embodiments.
Figure 10:
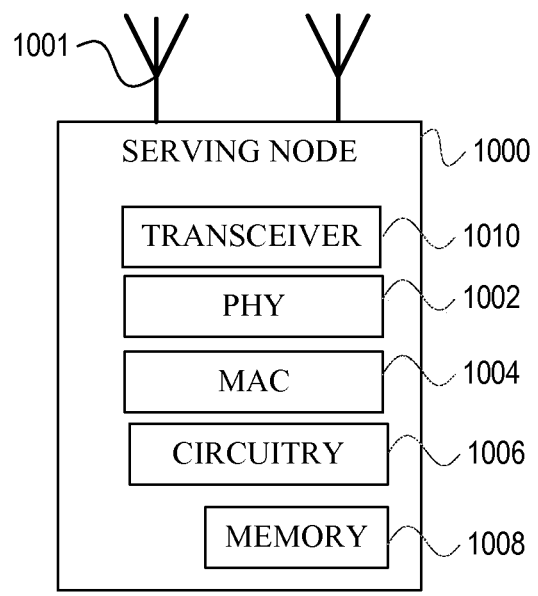
FIG. 10 illustrates a block diagram of an enhanced node B (eNB) in accordance with some embodiments.

FIG. 9 illustrates a block diagram of a UE 900 in accordance with some embodiments. FIG. 10 illustrates a block diagram of an eNB 1000 in accordance with some embodiments. It should be noted that in some embodiments, the eNB 1000 may be a stationary non-mobile device. The UE 900 may be a UE 102 as depicted in FIG. 1, while the eNB 1000 may be an eNB 104 as depicted in FIG. 1. The UE 900 may include physical layer circuitry (PHY) 902 for transmitting and receiving signals to and from the eNB 1000, other eNBs, other UEs or other devices using one or more antennas 901, while the eNB 1000 may include physical layer circuitry 1002 for transmitting and receiving signals to and from the UE 900, other eNBs, other UEs or other devices using one or more antennas 1001. The UE 900 may also include medium access control layer (MAC) circuitry 904 for controlling access to the wireless medium, while the eNB 1000 may also include medium access control layer (MAC) circuitry 1004 for controlling access to the wireless medium. The UE 900 may also include circuitry 906 and memory 908 arranged to perform the operations described herein, and the eNB 1000 may also include circuitry 1006 and memory 1008 arranged to perform the operations described herein. The UE 900 may include a transceiver 905 for controlling the antenna 901, while the eNB 1000 may include a transceiver 1010 for controlling the antenna 1001.

The antennas 901, 1001 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 901, 1001 may be effectively separated to take advantage of spatial diversity and the different channel characteristics that may result.

Although the UE 900 and eNB 1000 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In some embodiments, the UE 102 may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, or wearable device etc.), or other device that may receive and/or transmit information wirelessly. In some embodiments, the UE 102 may include one or more of a keyboard, a display, a non-volatile memory port, multiple antennas, a graphics processor, an application processor, speakers, and other mobile device elements. The display may be an LCD screen including a touch screen.

In accordance with embodiments, the UE 900 and eNB 1000 may be configured for one or more of the example embodiments described herein for determining the mobility of the UE 900 such as the methods disclosed in conjunction with FIGS. 1-8. The UE 900 and/or eNB 1000 may also be configured to report and receive the mobility of the UE 900 as well as to perform actions based on the mobility such as enhanced signaling if the UE 900 is mobile prior to a handover.

The following examples pertain to further embodiments. Example 1 is a user equipment (UE) configured to operate in a Long Term Evolution (LTE) network. The UE may include circuitry configured to: determine a plurality of signals from a serving cell, wherein each signal of the plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI). The circuitry may be further configured to determine one or more measures for each of a window size of the plurality of signals. The each measure of the one or more measures may be at least one from the following group: a variance of the plurality of signals, a standard deviation of the plurality of signals, a percent confidence interval (CI) of a mean of the one or more measures, and a linear combination of two or more of the one or more measures. The circuitry may be further configured to determine whether the UE is stationary based on the one or more measures.

In Example 2, the subject matter of Example 1 can optionally include where the circuitry is further configured to determine that the UE is stationary if the one or more measures is the variance of the plurality of signals and the variance of the plurality of signals is lower than a threshold variance.

In Example 3, the subject matter of Examples 1 or 2 can optionally include where the circuitry is further configured to determine whether the UE is at an edge of the serving cell; and use a first number for the window size if the UE is at the edge of the serving cell and use a second number for the window size if the UE is not at the edge of the serving cell.

In Example 4, the subject matter of any of Examples 1-3 can optionally include where the UE determines that the UE is at the edge of the serving cell if one or more signal of the plurality of signals is below a second threshold.

In Example 5, the subject matter of any of Examples 1-4 can optionally include where the circuitry is further configured to: determine that the UE is stationary if the standard deviation is below a threshold.

In Example 6, the subject matter of any of Examples 1-5 can optionally include where the circuitry is further configured to determine that the UE is stationary if a percent confidence interval (CI) of the one or more measures is above a threshold.

In Example 7, the subject matter of any of Examples 1-6 can optionally include where the window size of the plurality of signals is one of the following group: a fixed window size, a sliding window, and a variable window size.

In Example 8, the subject matter of any of Examples 1-7 can optionally include where the circuitry is further configured to determine a size of the variable window size based on a strength of the plurality of signals from a serving cell.

In Example 9, the subject matter of any of Examples 1-8 can optionally include where the circuitry is further configured to determine a second plurality of signals from a neighboring cell, wherein the second plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI).

In Example 10, the subject matter of any of Examples 1-9 can optionally include where the circuitry is further configured to determine a plurality of offsets between each signal of the plurality of signals from the serving cell and the corresponding signal of the second plurality of signals from the neighboring cell. The circuitry may be further configured to determine one or more second measures for each of a second window size of the plurality of offsets. The one or more second measures may be at least one from the following group: a variance of the plurality of offsets, a standard deviation of the plurality of offsets, a percent confidence interval (CI) of a mean of the one or more second measures, and a linear combination of two or more of the one or more second measures. The circuitry may be further configured to determine whether the UE is stationary based on the one or more second measures.

In Example 11, the subject matter of any of Examples 1-10 can optionally include wherein the circuitry is further configured to measure the plurality of signals from the serving cell if a signal strength from the serving cell changes more than a threshold.

In Example 12, the subject matter of any of Examples 1-11 can optionally include where the circuitry is further configured to apply a low-pass filter to each signal of the plurality of signals from the serving cell.

In Example 13, the subject matter of any of Examples 1-12 can optionally include where the circuitry is further configured to transmit to the serving cell an information element (IE) that indicates that the UE is stationary.

In Example 14, the subject matter of any of Examples 1-13 can optionally include where the IE is a mobility state IE, and where a spare bit in the mobility state IE is used to indicate whether the UE is stationary.

In Example 15, the subject matter of any of Examples 1-14 where the UE can optionally include memory and a transceiver where the memory and transceiver are coupled to the circuitry.

In Example 16, the subject matter of any of Examples 1-15 can optionally include one or more antennas coupled to the transceiver.

Example 17 is method on a user equipment (UE) in a Long Term Evolution (LTE) network. The method including determining a plurality of signals from a serving cell. Each signal of the plurality of signals may be at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI). The method may include determining a second plurality of signals from a neighboring cell. Each signal of the second plurality of signals may be at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI).

The method may include determining a plurality of offsets between each signal of the plurality of signals from the serving cell and the corresponding signal of the second plurality of signals from the neighboring cell. The method may further include determining one or more measures for each of a window size of the plurality of offsets, wherein each measure of the one or more measures is at least one from the following group: a variance of the plurality of offsets, a standard deviation of the plurality of offsets, a percent confidence interval (CI) of a mean of the plurality of offsets, and a linear combination of two or more of the one or more measures. Additionally, the method may include determining whether the wireless device is stationary based on the one or more measures.

In Example 18, the subject matter of Example 17 can optionally include where the method includes determining the UE is stationary if the variance is lower than a threshold variance.

In Example 19, the subject matter of Examples 17 or 18 can optionally include where the method further includes determining whether the UE is at an edge of the serving cell, and using a first number for the window size if the UE is at the edge of the serving cell and using a second number for the window size if the UE is not at the edge of the serving cell.

In Example 20, the subject matter of any of Examples 17-19 can optionally include where the method includes determining the UE is stationary if the standard deviation is below a threshold.

In Example 21, the subject matter of any of Examples 17-20 can optionally include where the method includes determining the UE is stationary if a percent confidence interval (CI) of the one or more measures is above a threshold.

In Example 22, the subject matter of any of Examples 17-21 can optionally include where the window size of the plurality of signals is one of the following group: a fixed window size, a sliding window, and a variable window size.

Example 23 is a non-transitory computer-readable storage medium that stores instructions for execution by one or more processors to perform operations. The instructions may configure the one or more processors to cause the user equipment to determine a plurality of signals from a serving cell. Each signal of the plurality of signals may be at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI).

Additionally, the instructions may configure the one or more processors to cause the user equipment to determine one or more measures for each of a window size of the plurality of signals, wherein each measure of the one or more measures is at least one from the following group: a variance of the plurality of signals, a standard deviation of the plurality of signals, a percent confidence interval (CI) of a mean of the one or more measures, and a linear combination of two or more of the one or more measures.

Moreover, the instructions may configure the one or more processors to cause the user equipment to determine whether the user equipment is stationary based on the one or more measures.

In Example 24, the subject matter of Example 23 can optionally include where the instructions are further to configure the one or more processors to cause the user equipment to determine a size of the window size based on the strength of the plurality of signals from a serving cell.

In Example 25, the subject matter of Example 23 can optionally include where the instructions are further to configure the one or more processors to cause the user equipment to determine the UE is stationary if the variance is lower than a threshold variance.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE), the UE comprising circuitry configured to:
   determine from a plurality of first reference signals from a serving cell and a plurality of second reference signals from a neighboring cell at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
   determine a plurality of offsets between each signal of the plurality of first reference signals from the serving cell and a corresponding second reference signal of the plurality of second reference signals from the neighboring cell;
   determine one or more measures for each of a window size of the plurality of offsets wherein each measure of the one or more measures is at least one from the following group: a variance of the plurality of offsets, a standard deviation of the plurality of offsets, a percent confidence interval (CI) of a mean of one or both of the variance and the standard deviation, and a linear combination of two or more of the variance, standard deviation, and the percent CI;
   determine whether the UE is stationary based on the one or more measures; and
   wherein the circuitry is further configured to transmit to the serving cell an information element (IE) that indicates whether the UE is stationary.

2. The UE of claim 1, wherein the circuitry is further configured to:
   determine that the UE is stationary if the one or more measures is the variance of the plurality of offsets and the variance of the plurality of offsets is lower than a threshold variance.

3. The UE of claim 1, wherein the circuitry is further configured to:
   determine whether the UE is at an edge of the serving cell; and
   use a first number for the window size if the UE is at the edge of the serving cell and use a second number for the window size if the UE is not at the edge of the serving cell.

4. The UE of claim 2, wherein the UE determines that the UE is at the edge of the serving cell if one or more offsets of the plurality of offsets is below a second threshold.

5. The UE of claim 1, wherein the circuitry is further configured to:
   determine that the UE is stationary if the one or more measures is the standard deviation of the plurality of offsets and the standard deviation of the plurality of offsets is below a threshold standard deviation.

6. The UE of claim 1, wherein the circuitry is further configured to:
   determine that the UE is stationary if the percent CI is above a threshold.

7. The UE of claim 1, wherein the window size of the plurality of offsets is one of the following group: a fixed window size, a sliding window, and a variable window size.

8. The UE of claim 7, wherein the circuitry is further configured to:
   determine a size of the variable window size based on a strength of the plurality of offsets.

9. The UE of claim 1, wherein the circuitry is further configured to apply a low-pass filter to each reference signal of the plurality of first reference signals from the serving cell.

10. The UE of claim 1, wherein the IE is a mobility state IE, and wherein one or more bits in the mobility state E is used to indicate whether the UE is stationary.

11. The UE of claim 1, further comprising memory and a transceiver coupled to the circuitry.

12. The UE of claim 11, further comprising one or more antennas coupled to the transceiver.

13. A method on a user equipment (UE), the method comprising:
   determining from a plurality of first reference signals from a serving cell at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
   determining from a plurality of second reference signals from a neighboring cell at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
   determining a plurality of offsets between each signal of the plurality of first reference signals from the serving cell and a corresponding signal of the plurality of second reference signals from the neighboring cell;
   determining one or more measures for each of a window size of the plurality of offsets, wherein each measure of the one or more measures is at least one from the following group: a variance of the plurality of offsets, a standard deviation of the plurality of offsets, a percent confidence interval (CI) of a mean of one or both of the variance and the standard deviation, and a linear combination of two or more of the variance, standard deviation, and the percent CI;
   determining whether the wireless device is stationary based on the one or more measures; and
   Transmitting to the serving cell an information element (IE) that indicates whether the UE is stationary.

14. The method of claim 13, further comprising:
   determining that the UE is stationary if the one or more measures is the variance of the plurality of offsets and the variance of the plurality of first reference signals is lower than a threshold variance.

15. The method of claim 13, further comprising:
   determining whether the UE is at an edge of the serving cell; and using a first number for the window size if the UE is at the edge of the serving cell and using a second number for the window size if the UE is not at the edge of the serving cell.

16. The method of claim 13, further comprising:
determining that the UE is stationary if the one or more measures is the standard deviation of the plurality of offsets and the standard deviation of the plurality of first signals is below a threshold standard deviation.

17. The method of claim 13, further comprising:
determining that the UE is stationary if the percent CI is above a threshold.

18. The method of claim 13, wherein the window size of the plurality of offsets is one of the following group: a fixed window size, a sliding window, and a variable window size.

19. A non-transitory computer-readable storage medium that stores instructions for execution by one or more processors of an apparatus of an user equipment the instructions to configure the one or more processors to:
determine from a plurality of first reference signals from a serving cell and a plurality of second reference signals from a neighboring cell is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
determine a plurality of offsets between each signal of the plurality of first reference signals from the serving cell and a corresponding second reference signal of the plurality of second reference signals from the neighboring cell;
determine one or more measures for each of a window size of the plurality of offsets wherein each measure of the one or more measures is at least one from the following group: a variance of the plurality of offsets, a standard deviation of the plurality of offsets, a percent confidence interval (CI) of a mean of one or both of the variance and the standard deviation, and a linear combination of two or more of the variance, standard deviation, and the percent CI; and
determine whether the UE is stationary based on the one or more measures; and
transmit to the serving cell an information element (IE) that indicates whether the UE is stationary.

20. The non-transitory computer-readable storage medium of claim 19, wherein the instructions are further to configure the one or more processors to: determine a size of the window size based on the strength of the plurality of first reference signals from a serving cell.

21. The non-transitory computer-readable storage medium of claim 19, wherein the instructions are further to configure the one or more processors to: determine that the UE is stationary if the one or more measures is the variance of the plurality of offsets and the variance of the plurality of signals is lower than a threshold variance.

\* \* \* \* \*

UNITED STATES PATENT AND TRADEMARK OFFICE
CERTIFICATE OF CORRECTION

PATENT NO. : 10,306,584 B2
APPLICATION NO. : 15/111880
DATED : May 28, 2019
INVENTOR(S) : Yiu et al.

Page 1 of 1

It is certified that error appears in the above-identified patent and that said Letters Patent is hereby corrected as shown below:

In the Claims

In Column 14, Line 19, in Claim 10, delete "E" and insert --IE-- therefor

In Column 14, Line 58, in Claim 13, delete "Transmitting" and insert --transmitting-- therefor In Column 16, Line 12, in Claim 19, after "CI;", delete "and"

Signed and Sealed this
Fourteenth Day of April, 2020

Andrei Iancu
*Director of the United States Patent and Trademark Office*